United States Patent [19]
Hals

[11] Patent Number: 6,089,656
[45] Date of Patent: *Jul. 18, 2000

[54] SPRING-ACTION SEAT SUSPENSION ASSEMBLY FOR A TWO-WHEELER

[75] Inventor: Cato Hals, Oslo, Norway

[73] Assignee: Hals-Lauritzen A/S, Moss, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,931

[22] PCT Filed: May 31, 1996

[86] PCT No.: PCT/NO96/00134

§ 371 Date: Apr. 24, 1998

§ 102(e) Date: Apr. 24, 1998

[87] PCT Pub. No.: WO96/38335

PCT Pub. Date: Dec. 5, 1996

[30] Foreign Application Priority Data

Jun. 1, 1995 [NO] Norway ..................................... 952186

[51] Int. Cl.$^7$ ....................................................... B62J 1/00
[52] U.S. Cl. ................... 297/215.13; 297/195.1; 297/211
[58] Field of Search ................. 297/195.1, 208, 297/209, 211, 215.13

[56] References Cited

U.S. PATENT DOCUMENTS

| | | | |
|---|---|---|---|
| 1,229,468 | 6/1917 | Jackson | 297/211 |
| 2,167,912 | 8/1939 | Schwinn | 297/209 |
| 2,331,213 | 10/1943 | Mesinger | 297/208 |
| 3,481,628 | 12/1969 | Brilando et al. | 297/209 |
| 5,024,413 | 6/1991 | Papp | 297/209 X |
| 5,464,271 | 11/1995 | McFarland | 297/208 X |
| 5,489,139 | 2/1996 | McFarland | 297/195.1 |

FOREIGN PATENT DOCUMENTS

| | | |
|---|---|---|
| 0418429 | 3/1991 | European Pat. Off. . |
| 574030 | 11/1925 | France . |
| 924001 | 7/1947 | France . |
| 2491425 | 4/1982 | France . |
| 4224941 | 7/1992 | Germany . |

*Primary Examiner*—Peter M. Cuomo
*Assistant Examiner*—Stephen Vu
*Attorney, Agent, or Firm*—Dickinson Wright PLLC

[57] ABSTRACT

A springy seat recliner assembly for a bicycle comprises three sections, namely a seat post member (20) to be entered and clamped in a seat tube, further a movable intermediate section (3, 4), and a seat attachment part (2) having attachment details for a conventional saddle. The intermediate section comprises substantially parallel or the seat post member (20) and on the seat attachment part (2), as well as a springing mechanism mounted in between two diagonally placed bearings (23, 28) to push the seat attachment part (2) upwards. When the rear wheel receives a shock, a very good compensating cushioning movement directed obliquely downwards and backwards is obtained.

11 Claims, 5 Drawing Sheets

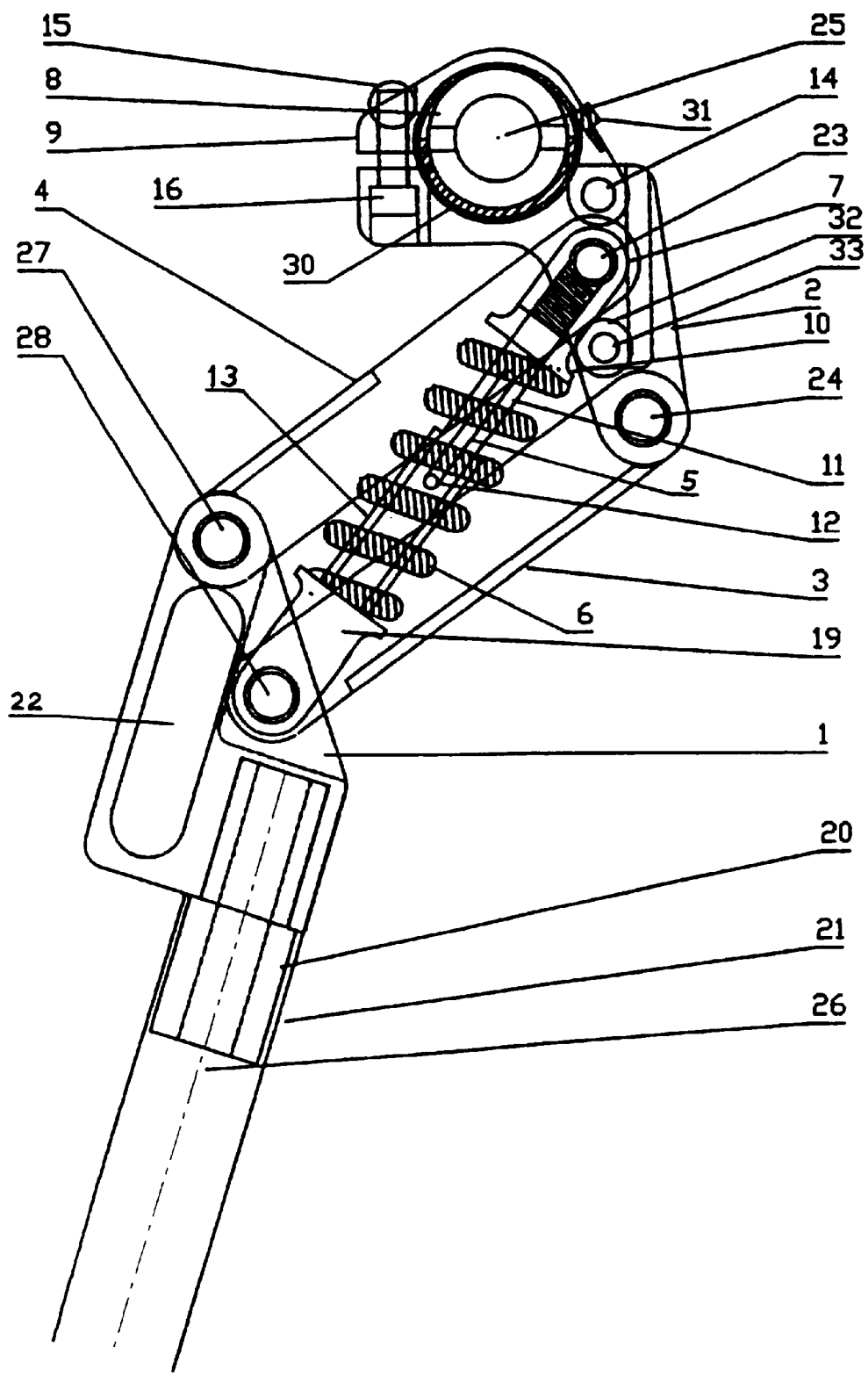

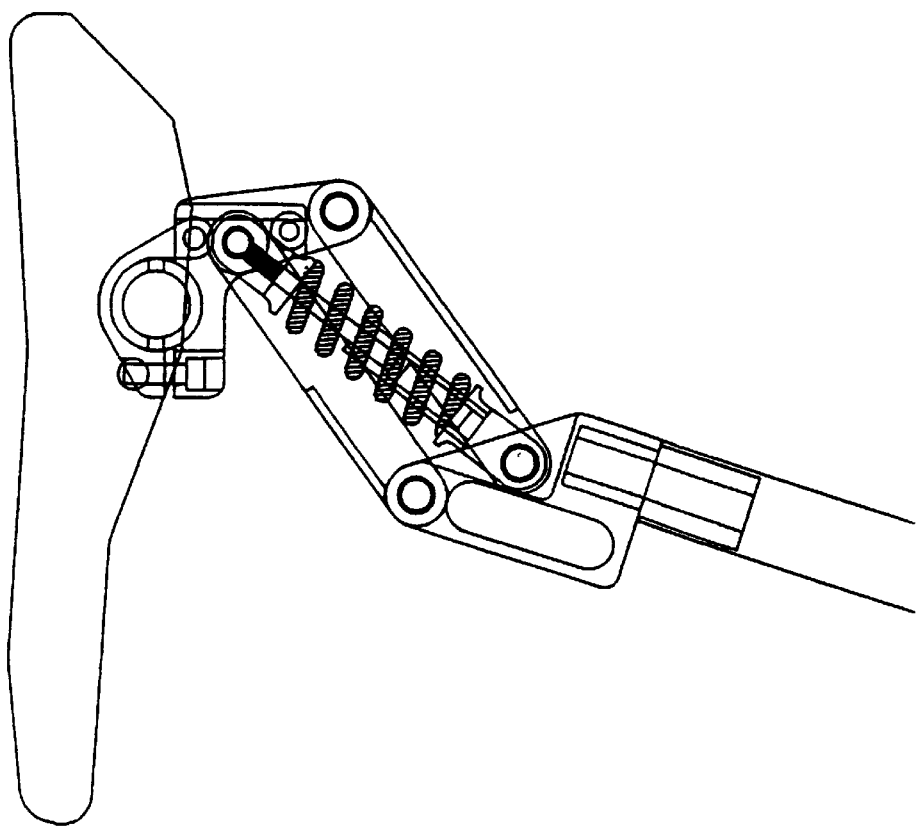
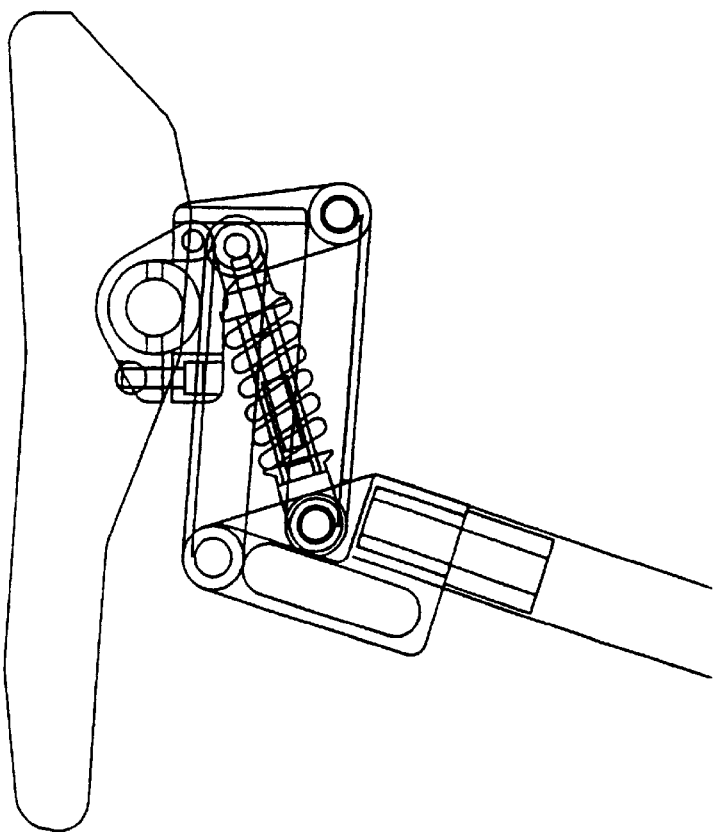

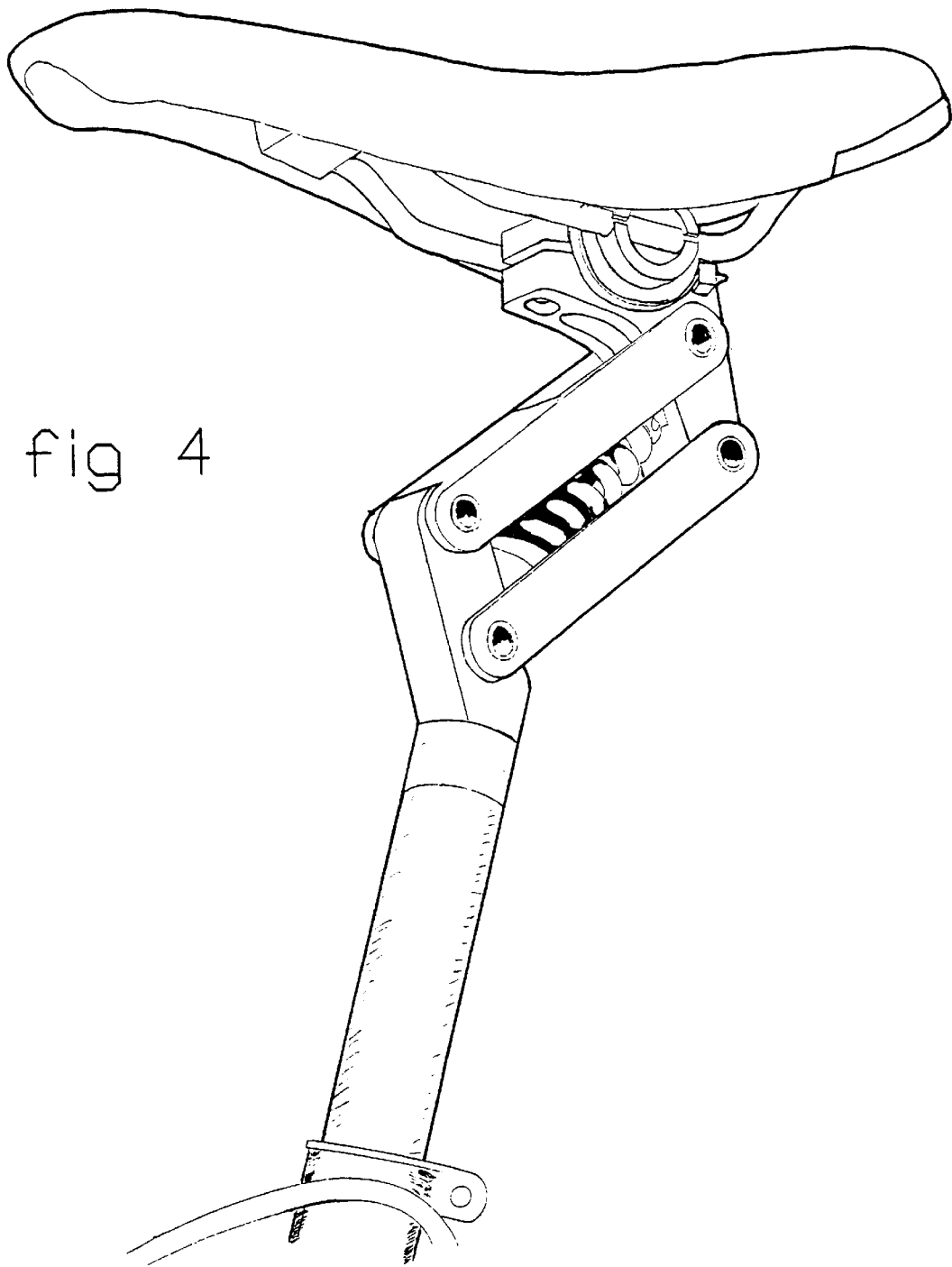

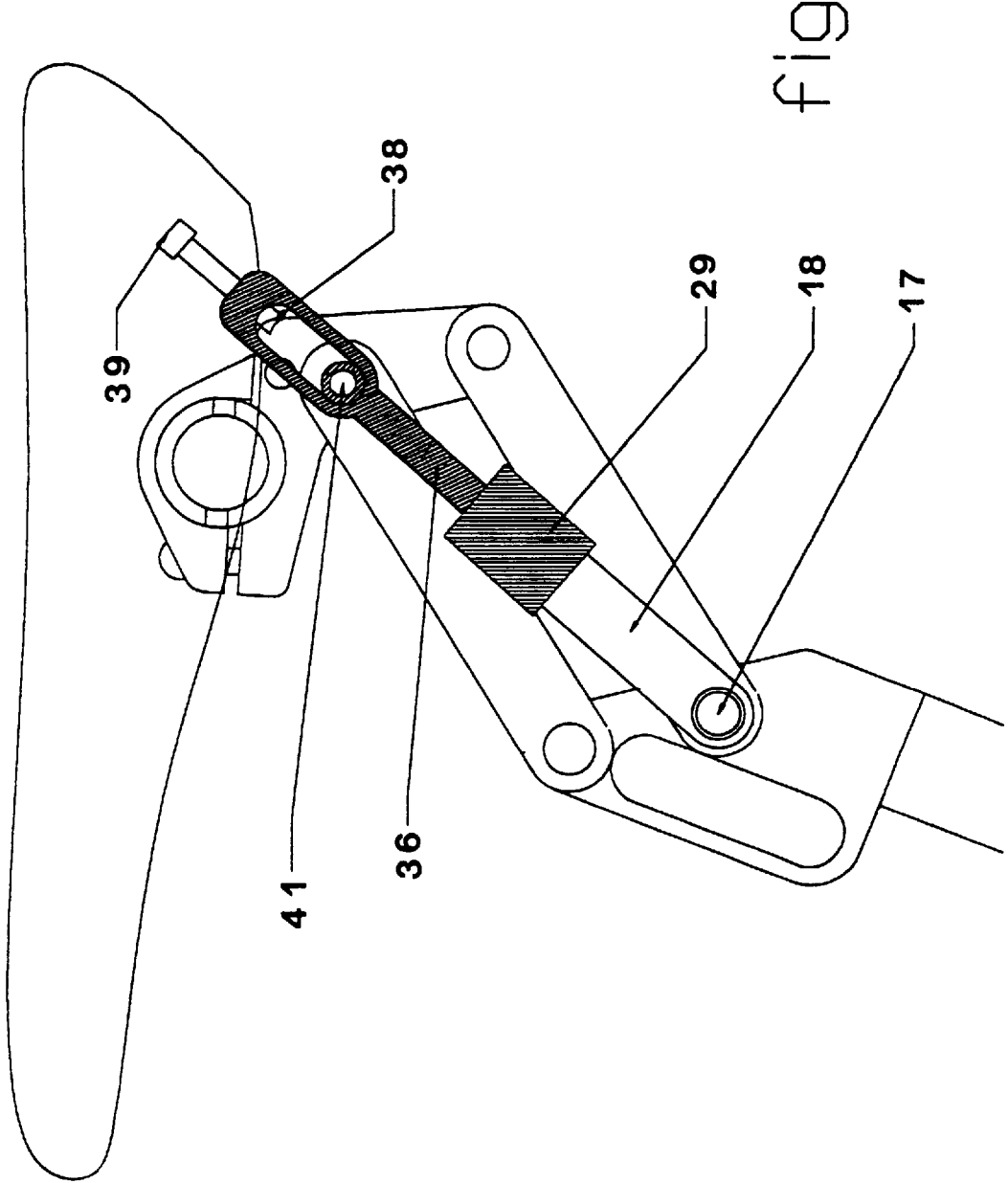

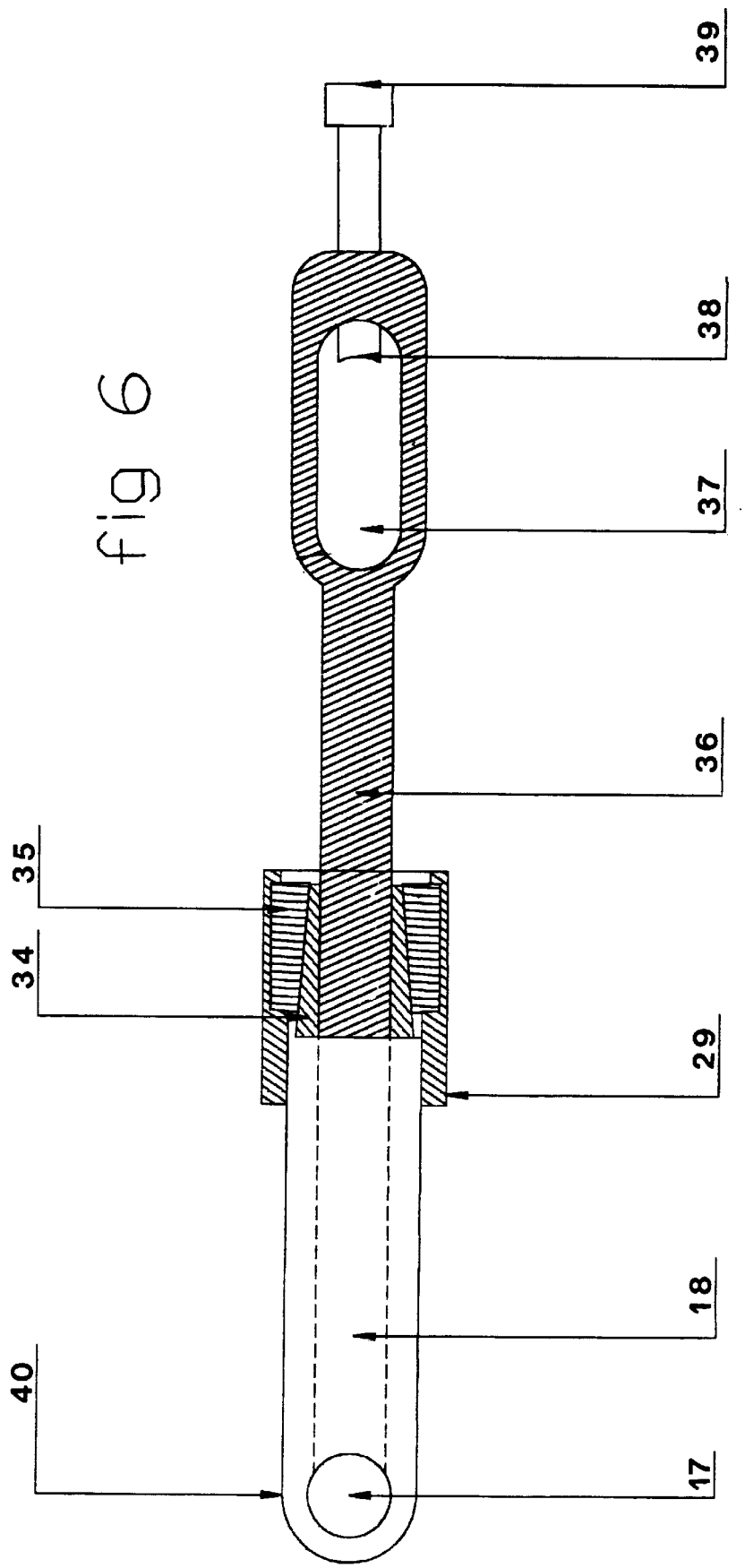

SPRING-ACTION SEAT SUSPENSION ASSEMBLY FOR A TWO-WHEELER

FIELD OF THE INVENTION

The present invention relates to a cushioning system in connection with the sitting means of a bicycle, and relates more precisely to a springy seat retainer assembly intended to be mounted on a standard bicycle in the position in the bicycle frame where the conventional seat post is usually entered down into the seat tube. Further, it is intended that a standard seat shall be mounted on top of the seat retainer assembly in accordance with the invention.

BACKGROUND OF THE INVENTION

There are several types of previously known cushioning solutions in connection with bicycle seats, the most well-known one is the means having two helical springs at the rear end of the seat and constituting a part of the seat itself. Such helical springs have a very limited travel, at the same time as the front edge of the seat remains un-cushioned. This type of cushioning will increase comfort somewhat, but is not appropriate to accommodate the type of shock which occurs in particular in off-road bicycling.

Among recent types of cushioning for bicycle seats, a solution can be mentioned wherein the seat has a spring action in a telescopic assembly inside or along the seat tube, which tube in most bicycles is slanted in a direction down toward the crank bearing. This type of cushioning has a clear limitation in that the travel of the system along the seat tube in the spring action, is as much as 45° mis-directed. This also has the effect that all attempts to obtain a long travel for such systems have not been successful, because the movement component in the wrong direction increases with an increase in the travel along the seat tube, and this becomes very noticable whenever the bumps are larger than a certain size, typically 10–15 mm.

Another previously known type of cushioning is the one in which a seat is springy by being mounted on a long and flexible arm attached to the bicycle's top tube adjacent to the handlebar bearing. This system makes it impossible to provide any bias, which leads to a tendency to swing up and down for the bicyclist during ordinary bicycling. Further, such a system has the problem that the seat will bound upwards quite far, when the bicyclist slides off the seat while moving his body rearwardly to avoid falling forward over the handlebar in a steep downhill ride, and this makes it rather difficult to get back onto the seat again afterwards. The correct distance to the pedals is achieved while the bicyclist sits on a seat which is pushed down, and without a weight on top, the seat will take a relatively high position.

From European patent application with publication number 0418429 there is known a springy saddle device for a two-wheeled vehicle, particularly for a moped or a motor-cycle. An articulated system having parallel swinging arms connected to a helical spring down inside a saddle post, is attached directly to the frame, and the saddle framework is also attached directly to the swinging arms. A substantially downwardly directed movement is achieved with this device, however the device cannot be used as an optional part inserted between a standard bicycle frame and a standard seat.

A springy device for a bicycle seat is previously known from German Offenlegungsschrift number 4224941, which device is based upon a helical spring built into a seat post substitute. An adapted cylinder can slide up and down in a substantially vertical guide element behind the seat tube, and the cylindrical slide member is connected to the helical spring inside the seat post via a wire drive passing over one or more guide wheels. The seat is mounted on top of the cylindrical slide member, and thus will be able to spring substantially vertically up and down. The wire drive solution entails obvious weaknesses, and the construction does not seem particularly robust in practice.

In a situation where the bicycle rear wheel hits a bump, the whole frame and everything mounted thereto, will start to rotate around the front wheel hub of the bicycle. This causes the seat, which is situated much higher than the bicycle hubs, to move forward in the speed direction in addition to an upward movement. With a built-in option for e.g. telescopic springing down along the seat tube, as mentioned above, one further forward movement component will arise when this type of springing goes into operation, as long as the frame seat tube is slanted as is normally the case for pedal bicycles. In practice this means that the seat, in addition to travelling up an down, will also travel forward and back beneath the cyclist at any bump. If the bump is 40 mm in height, the seat will attempt to move approximately 40 mm forward and back beneath the buttocks of the cyclist. Thereby the forces involved in these movements will try to pull the bicycle in a rearward direction, while the bicyclist attempts to push the bicycle in a forward direction by producing a force against the pedals and the bicycle drive unit. Thus, the forces will appear in opposition to the bicycle propulsion. In addition, also some energy will be lost because the transfer of forces will create friction in the system due to an unfavourable attack angle. In general the cushioning effect will also be reduced. These consequences are due to the horizontal movement components which are not compensated for in previously known seat post constructions.

SUMMARY OF THE INVENTION

Hence, the present invention has been conceived to solve the problem of compensating for both vertical and horizontal movement components when the rear wheel receives a shock, and to be able to achieve a transfer to the springy medium with a very low friction. Further, the invention has been provided to produce a sturdy seat retainer assembly where all forces involved in the shock absorption are transferred as free of friction as possible to the springy medium by compensating for movements and forces which would otherwise be applied to the seat and the bicyclist, where the cushioning movement has a long travel, and where, as a consequence of the construction, it is possible to achieve a good return damping of the springing.

The above goals are attained in accordance with the invention by providing a springy seat retainer assembly of the type defined precisely in the appended patent claim 1. Further favourable embodiments of the invention are stated in the appended dependent claims.

BRIEF DESCRIPTION OF THE DRAWINGS

In the following the invention will be illuminated further through a detailed description of embodiment examples, and in this connection it is referred to the enclosed drawings, where FIG. 1 shows an embodiment of the invention where a complete seat retainer assembly appears in a side cross section view, FIG. 2 shows the same assembly as FIG. 1, however with an attached saddle and in a depressed position, FIG. 3 shows the assembly in the same manner as in FIG. 2, however in an unloaded position, FIG. 4 shows a perspective view of an embodiment of the assembly in accordance with the invention, with a seat attached and sitting in a seat frame tube, FIG. 5 shows an embodiment of the assembly of the invention including an optional damper equipment to provide further favourable effect for the invention, and FIG. 6 shows an example of an embodiment of the optional damper equipment shown in FIG. 5.

DESCRIPTION OF THE PREFERRED EMBODIMENT

In general the seat retainer assembly of the invention will comprise three main sections, namely at the bottom a seat post member, further a movable intermediate section, and on top a saddle attachment part to which a standard bicycle seat can be attached. In FIGS. 1, 2 and 3 appears a favourable embodiment of the invention, and the seat post member, which is adapted to be entered and clamped in a standard seat tube 21 as a substitute for a conventional seat post, is provided with reference numeral 20. The seat attachment part on top, which is equipped with attachment details for a conventional bicycle saddle, is provided with reference numeral 2. Between these two sections there is a movable intermediate section which in one end thereof is attached to an upper part of seat post member 20, in the following referred to as the post head 1, and in its other end the movable intermediate section is attached to the seat attachment part 2. The intermediate section comprises substantially parallel bars 3, 4 each of which being journalled in one end on a bearing 27, 28 in the post head 1, and in the other end on a bearing 23, 24 in a lower portion of the seat attachment part 2. Reference numerals 3 and 4 may each designate two respective bars, i.e. in total four bars where two by two are placed right behind each other in FIGS. 1–3 so that only one upper and one lower bar is visible in the drawing. Thereby a necessary space is provided for a spring mechanism (see below) between the bars. Optionally a two-bar configuration may be used, in which case the necessary space between bars 3 and 4 is provided by each respective bar having a cross-sectional shape similar to a "box" or a "U". (FIG. 4 shows such a design of bars 3 and 4.) An intermediate solution with three bars is of course also possible, for example using one upper U cross section bar 4 on top and two separate bars 3 therebelow.

At the outset the bars are equal in length, and hence they are able to provide a swinging movement for the seat attachment part 2 about the bearings 27, 28 in the post head 1, which swinging movement is such that the seat attachment part 2 maintains its orientation in space during the movement. This is referred to as a parallellogram motion. However, in certain cases it will be desirable to achieve a movement which deviates somewhat from a perfect parallellogram motion, and it may then be interesting to shorten e.g. the upper one of the bars 4 a little as compared to the lower one 3. It may be desirable e.g. to rotate the saddle somewhat during a downward directed cushioning movement in order to compensate for the rotating movement of the bicycle during the shock from below against the rear wheel. Thereby the saddle is maintained parallel with the ground during the shock, instead of parallel to an imagined horizontal line fixed to the bicycle frame, corresponding to the top tube of an "old-fashioned" frame.

The actual springing is provided by a spring mechanism which is mounted in between two diagonally situated ones of the bearings 23, 24, 27, 28 in order to provide a force which urges the seat attachment part 2 upward (and against a load from above on the saddle or against a blocking stop means for upwardly directed movement, see below). Thus, in an unloaded condition, a favourable embodiment of the seat retainer assembly of the invention may appear as in FIG. 1, where no saddle has been drawn in the upper part of the figure. However, FIGS. 2 and 3 show the same embodiment of the seat retainer assembly with a saddle mounted, respectively in a maximum depressed position and an unloaded upper position of the assembly.

When looking at FIG. 1, it appears clearly that there are two possibilities for placing the spring mechanism between two diagonally situated bearings, and the option shown in FIG. 1 is the first preferred embodiment, where the spring 6, which in the embodiment shown is a helical spring, provides an expansion force out against the lower bearing 28 and the top bearing 23 (alternatively, such a spring might be mounted between the top bearing 27 on the post head 1 and the lower bearing 24 on the seat attachment part 2, but in that case the spring would have to be of a type providing a contraction force between the two bearings in order to push the seat attachment part 2 upwards.)

The helical spring 6 is arranged in the vicinity of elongated opening 22 on the outside of a telescopic-action guide having an outer member 13 in the bottom, into which an inner member 11 on top is able to slide. The two telescopic members 11 and 13 are fixed to bearings 28, 23 in both ends by fixing means 7, 19. A slit 5 in the upper member 11 of the telescopic guide cooperates in the embodiment shown here, with a stop cotter 12 in the lower member 13 of the telescopic guide, and constitutes together with a threaded cog rim on top of member 11, a biasing means 10 to define an upper position for the saddle or the seat attachment part 2 by the stop cotter 12 engaging the lower end of the slit 5. When the seat is pushed down in a load situation, the upper telescopic member 11 travels down into the lower telescopic member 13, the stop cotter 12 then sliding in the slit 5. A smooth and linear movement of spring 6 is ensured by the inner telescopic guide 11, 13.

In order to avoid a hard jolt finally when a full deflection occurs, i.e. as far as the assembly is able to spring, stop devices are arranged to provide soft limiting of the deflection in both directions. An attachment detail 8 on the seat attachment part 2 may e.g. be equipped with a member of a resilient material 30 to operate as a soft stopping device in order to limit the downward deflection of the assembly, by letting the resilient member 30 engage the top surface of the upper bar 4, see the illustration in FIG. 2, where member 30 engages the top surface on bar 4.

Such a soft limitation of the deflection may also be necessary for the upward return movement, and in this respect there may be arranged e.g. a stop bolt 33 on the seat attachment part 2 in a position between the bearings 23 and 24. The stop bolt 33 then has an outer layer 32 of resilient material to provide a soft final jolt for the upward movement when the stop bolt hits the lower edge of the upper bar 4.

Other configurations which provide a soft final cushioning are of course possible, for example the stop cotter 12 may encounter a resilient material at the end of slit 5. Optionally, this whole problem may be solved by means of a (not shown) longitudinal sleeve device inside the helical spring 6, having a central rod with two shoulders in spaced relation, which shoulders, upon movement of the system, encounter cup spring disks arranged in two end positions in a surrounding sleeve, which sleeve will also provide the option of bias adjustment by providing one end of the sleeve with an outer part having threads for screw adjustment.

To achieve the most favourable cushioning movement the way the seat retainer assembly is shown in FIG. 1, with upward/rearward slanting bars 3, 4, the center 25 of saddle attachment in the seat attachment part 2 should be placed above and somewhat in front of the rear bearings 23 and 24, so that a vertical line through the center 25 both in an unloaded assembly position and in any other position will be situated between bearing pair 27, 28 on the post head 1 and bearing pair 23, 24 on the seat attachment part 2. Another important feature to ensure optimum movement during spring-action, is that bearing pair 23, 24 on the seat attachment part 2 already in an unloaded seat position is situated behind the extension of the seat tube axis 26.

In the embodiment of the seat retainer assembly shown in FIG. 1, the seat attachment part 2 is equipped on top with two attachment halves 8 (previously referred to as "attachment details") for clamping a standard saddle in the seat attachment part 2. A screw 16 and a hoop 9 hinged to the seat attachment part in a suspension point 14, completes the seat attachment part. (For the rest, such attachment details are shown in part in FIG. 4.) Reference numeral 15 designates a counterpart to the screw 16, in the form of a cylindrical bed nut. As previously mentioned, there may be a resilient material 30 as an outer layer surrounding at least the lower one of the attachment halves 8, serving as a soft stop. In order to retain the resilient material in place, e.g. plastic strips 31 may be used around the halves 8.

The resilient material which in the shown embodiment is used as a spring medium in addition to the helical spring 6 in the extreme phases of the cushioning sequence to prevent that the metal structures of the construction collide when the load is high due to a sharp bump, is preferably neoprene or a similar material. The stop bolt 33 may for example be a through bolt having threads in both ends, and having a neoprene ring 32 and a screw mounted thereto on both sides of the seat attachment part 2.

The location of the center 25 on top of the seat attachment part 2 in relation to the axis 26 in the seat tube 21, will be in the same range as ordinary for saddle posts without cushioning, by having this center 25 placed in an advanced position with respect to the rear bearing pins 23, 24, however preferably not so far as to place the center in front of the extension of axis 26. The distance from center 25 to the extension of the axis 26 is defined as the seat post "offset", and is typically between 0 and 25 mm in bicycles without a cushioning seat post. It is therefore possible to define the seat post offset by choosing bias. The distance should typically be between 0 and 25 mm when the seat retainer assembly is part depressed, i.e. when the bicyclist is sitting on the saddle in a normal riding position.

In use the invention will operate as follows: When receiving a pressure from below when the bicycle runs over a bump, the post head 1 will move obliquely upwards. The parallel bars 3, 4 will rotate opposite to this movement, and at the same time the diagonal distance from the lower bearing 28 on the post head 1 to the upper bearing 23 on the seat attachment part 2 will decrease, whereby the helical spring 6 is compressed simultaneously with a compression of the telescopic guide 11, 13 which provides a linear and stable compression of spring 6, until the neoprene material 30 on the attachment detail 8 for the saddle possibly engages the top bar 4 so that the neoprene material is compressed in addition to the helical spring. If the bars are equally long and parallel, the bicycle saddle will remain parallel to itself (and the bicycle frame) during this movement.

Return damping in the cushioning movement is obtained at the outset in the following manner: Swinging movements that the helical spring attempts to impose on the system, are damped by the attempt to force the bicyclist's body forward and back when the saddle changes its average distance to the foundation. The forces in the up/down movement which one tries to dampen, act against the forces acting forward and back. These forces try to nullify each other, and the result is that the system settles down in that distance to the foundation which was pre-determined when setting the bias and the seat height. Thus, damping is achieved without any special damping means, and can be stated to be a "passive" damping effect.

In the cases where it is nevertheless desirable with additional return damping, this can possibly be achieved by mounting an optional equipment which is to be discussed in the following text, and which then provides an "active" type of return damping. In this connection it is referred to FIGS. 5 and 6.

As appears from FIG. 5, a return damper device which mainly consists of two telescopically operating members 18 and 36, wherein member 18 has an internal friction/damper medium against movement of member 36, is attached to the lower bearing 28 on the post head and the top bearing 23 on the seat attachment part. The attachment is made by utilizing the fact that the bearings 23, 24, 27, 28 are configured having central through holes such as shown in FIG. 4. Extended bolts 17, 41 can be inserted in these holes to provide a basis for mounting the damper device. As appears from FIG. 5, the upper extended center bolt 41 is equipped with an outer resilient sleeve made of e.g. neoprene material. Further it is to be noted that to accommodate the upper part of the damper device between a conventional saddle bar and the sitting portion of the saddle, compare e.g. FIG. 4, there is inserted an additional spacer on the extension bolt 41 so that the damper device 18, 36 is somewhat tilted outwards in the upward direction. For this reason the attachment hole 40 (see FIG. 6) in the lower end of member 18 must at the same time be shaped so as to make the attachment possible, e.g. by having a curved inside shape. A similar tilting option (at bolt 17) for the damper device may also be achieved by means of a special (standard) type of bearing for angle deviation suspension.

When the main spring 6 inside the "parallellogram" is compressed, the distance between bearings decreases. During such a compression the guide bar 36 will be pushed down into the sleeve member 18 by the extension bolt 41. However, an elongate, longitudinal hole 37 is provided in the upper part of the guide bar 36, see FIG. 6. Thus, in a successive upward movement of the assembly, the extension bolt 41 will be able to travel some distance upwards in the elongate hole 37 without starting any friction effect. The length of this free travel can be determined by means of a screw in the upper end of the guide bar 36, the screw tip 38 being movable downwards to effectively shorten the elongate hole 37 upon operating the screw head 39. If active damping is desirable throughout the cushioning movement, the screw tip 38 is screwed all the way in to engage bolt 41, see FIG. 5. If it is desirable having ranges without active friction/damping, which may be favourable e.g. to pass small bumps without losing too much energy to the damping system, this is achieved by choosing a certain effective length of the elongate hole 37 using the screw head 39. In this manner it is possible to achieve an optional frictionless movement in an "average activity range", i.e. when the bicyclist sits down on the saddle, the guide bar 36 is pushed down against friction, and small frictionless movements may be made around a mean sitting height, while larger deflections will be exposed to active damping.

In FIG. 6 there is also shown an example of an embodiment of the friction device inside sleeve 18. A friction sleeve 34, made of e.g. teflon material, directly engages the guide bar 36, and is prone to wear. Right outside the friction sleeve 34 there is arranged a surrounding sleeve made of a resilient material, for example rubber or neoprene. Tightening/adjustment of friction can be made by having the two parts 34 and 35 with a conical shape, such as shown, and surrounding them by a tightening sleeve 29 with threads, which can be screwed so that the resilient sleeve 35 is tightened harder and harder against the friction sleeve 34. Some automatic readjustment is achieved by the resilient sleeve 35 itself, so that it is not necessary to readjust the amount of friction too often. Of course, alternatively the sleeve member 18 may equally well comprise an oil damper of per se known type.

As an alternative to the screw with a head 38 and tip 39, there may e.g. be arranged a threaded outer sleeve on the elongate hole section in the upper end of guide bar 36, with the same limiting function as the screw 38, 39.

A consequence of the function of the seat retainer assembly of the invention, is that the bicycle saddle will move further upward and forward when a lower weight is applied to the saddle. This means that the sitting position will change somewhat during bicycling, the saddle will actually be shifted somewhat upward and forward the harder the bicyclist is pedalling (and thereby lifts his own body or eases the pressure on the saddle). Such an effect arises e.g. in a steep hill, where it is necessary to push hard on the pedals. This will actually contribute to provide a more correct positioning of the bicyclist's center of gravity, and a more correct pedalling ergonomy in such situations. Another situation where the same effect is favourable, is at high speeds on flat ground.

In order to make the seat retainer assembly less heavy, and to enable locking of the seat retainer assembly together with the rest of the bicycle, a round or elongate hole 22 can advantageously be cut out in the post head 1 below the upper bearing 27, such as appears in the embodiment shown in FIGS. 1, 2 and 3.

What is claimed is:

1. A springy seat retainer assembly for a two-wheeled vehicle, preferably a bicycle, said assembly being adapted for conventional entry in a vehicle frame seat tube (21) and to hold a standard bicycle saddle said assembly comprising a seat post member (20) having an end for entry and tightening in said seat tube (21) and a post head (1) protruding above said seat tube (21), a saddle attachment assembly (2) having attachment portions (8, 9, 14, 17) for mounting a saddle, at least two substantially parallel bars (3,4) wherein each of said bars being journalled in one end thereof to a first diagonal bearing set (27, 28) on said post head (1), and in a second end to a second diagonal bearing set (23, 24) on a lower portion of said saddle attachment assembly (2), and a spring mechanism (6, 7, 10, 11, 12, 13, 19) mounted between said bars (3, 4) to provide a force urging said saddle attachment assembly (2) in a generally upward direction, wherein said spring mechanism (6, 7, 10, 11, 12, 13, 19) is generally mounted between said bearing sets (23 24, 27 28), and that said bearing sets intersect a line that is generally perpendicular to a top surface of the saddle to enable extended deflection for the saddle during spring action, said bars (3, 4) being directed obliquely upwards/rearwards in relation to an extended seat tube axis line (26) when said assembly is in an unloaded condition.

2. The seat retainer assembly of claim 1, wherein a distance between two of said bearings (23, 24, 27, 28) is shortened by the upper bar (4) being shorter than said lower bar (3), whereby the saddle is rotated during a downward cushioning movement for said assembly in order to compensate for the rotation movement of the vehicle during a shock against the vehicle rear wheel.

3. The seat retainer assembly of claim 1, wherein said spring mechanism (6, 7, 10, 11, 12, 13, 19) provides an expansion force and is mounted between a lower bearing (28) of said first bearing set (27, 28) on said post head (1) and an upper bearings (23) of said second bearing set (23, 24) on said seat attachment assembly (2).

4. The seat retainer assembly of claim 3, wherein said spring mechanism comprises a helical spring (6) mounted around a telescopic acting guide (11, 13) wherein the guide is connected between said first and second bearing sets (28, 23) by an attachment mean (7, 19).

5. The seat retainer assembly of claim 4, comprising a biasing device (10) with a threaded cog rim on an end portion of one member (11) of the telescopic-acting guide for defining a pre-set upper seat position by placing a slit (5) in said one member (11) of the guide relative to an engaging stop cotter (12) in the second member (13) of said guide.

6. The seat retainer assembly of claim 4, comprising stop means (30, 32, 33) for limiting the deflection of the spring mechanism.

7. The seat retainer assembly of claim 6, comprising a stop bolt (33) surrounded by resilient material (32) and provided on said seat attachment assembly (2) in a position substantially between the second bearing set (23, 24) thereon, as a stop means for limiting upward deflection.

8. The seat retainer assembly of claim 6, comprising one of said attachment portions (8) on said saddle attachment assembly (2) with a resilient material (30) which operates as a stop means for limiting downward deflection of said spring mechanism by engaging against a top surface of one of the parallel bars (4).

9. The seat retainer assembly of claim 1, wherein the second bearing set (23, 24) on said saddle attachment assembly (2) in an unloaded seat position is situated behind an extension of the axis (26) of the seat tube (21).

10. The seat retainer assembly of claim 1 comprising a return damper device (18, 36) arranged outside of and between bearing-extensions (17, 41), and substantially parallel to said spring mechanism, said damper device having an elongate longitudinal hole (37) on one end for cooperation with one of said bearing extensions (41) to provide an adjustable free travel range without damping.

11. The seat retainer assembly of claim 1, wherein the spring mechanism (6, 7, 10, 11, 12, 13, 19) is mounted to said first and second bearing sets (23, 28).

* * * * *